United States Patent
Wang et al.

(10) Patent No.: US 9,288,726 B2
(45) Date of Patent: Mar. 15, 2016

(54) SYSTEMS AND METHODS FOR OBTAINING SUBSCRIBER ACCESS INFORMATION BY A CORE NETWORK IN A HANDOVER PROCESS

(75) Inventors: Shengming Wang, Shenzhen (CN); Lin Liu, Shenzhen (CN); Di Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1054 days.

(21) Appl. No.: 13/384,902

(22) PCT Filed: Aug. 24, 2010

(86) PCT No.: PCT/CN2010/076296
§ 371 (c)(1),
(2), (4) Date: Jan. 19, 2012

(87) PCT Pub. No.: WO2011/023099
PCT Pub. Date: Mar. 3, 2011

(65) Prior Publication Data
US 2012/0207132 A1  Aug. 16, 2012

(30) Foreign Application Priority Data

Aug. 26, 2009 (CN) .......................... 2009 1 0167161

(51) Int. Cl.
*H04W 36/08* (2009.01)
*H04W 8/20* (2009.01)
(Continued)

(52) U.S. Cl.
CPC ................ *H04W 36/08* (2013.01); *H04W 8/20* (2013.01); *H04W 8/26* (2013.01); *H04W 48/02* (2013.01); *H04W 48/16* (2013.01); *H04W 74/00* (2013.01)

(58) Field of Classification Search
None
See application file for complete search history.

(56) References Cited

U.S. PATENT DOCUMENTS

2006/0073831 A1\*  4/2006  Guyot et al. .................. 455/443
2008/0034080 A1\*  2/2008  Chamaraj et al. ............. 709/223

(Continued)

FOREIGN PATENT DOCUMENTS

| CN | 101312593 A | 11/2008 |
|---|---|---|
| CN | 101340701 A | 1/2009 |
| CN | 101400106 A | 4/2009 |

OTHER PUBLICATIONS

International Search Report for PCT/CN2010/076296 dated Nov. 19, 2010.

(Continued)

*Primary Examiner* — Omar Ghowrwal
(74) *Attorney, Agent, or Firm* — Ling Wu; Stephen Yang; Ling and Yang Intellectual Property

(57) ABSTRACT

The present invention discloses a method for a core network to obtain user access information during a handover procedure, which includes: when the user handovers between HNBs or HeNBs and the core network does not carry out access control of the user, if the destination HeNB is connected to the core network directly or the user which does not support a closed subscriber group handovers to a hybrid destination HNB, the network element which controls the access of the user transmitting membership information of the user to the core network. The invention also discloses a corresponding system. The invention realizes that under the condition that the RAN side controlling the access of the UE during the handover process and the CN cannot know the membership of the UE, the RAN side notifying the core network of the membership information of the UE and the information of the H(e)NB.

17 Claims, 3 Drawing Sheets

(51) Int. Cl.
  *H04W 8/26* (2009.01)
  *H04W 48/02* (2009.01)
  *H04W 48/16* (2009.01)
  *H04W 74/00* (2009.01)

(56) References Cited

U.S. PATENT DOCUMENTS

2009/0264077 A1* 10/2009 Damnjanovic ............... 455/63.1
2010/0041405 A1* 2/2010 Gallagher et al. ............ 455/436
2010/0074129 A1* 3/2010 Wang et al. ................... 370/252
2011/0164590 A1* 7/2011 Wang et al. ................... 370/331
2011/0223919 A1* 9/2011 Vikberg et al. ............... 455/436
2012/0129497 A1* 5/2012 De Benedittis et al. ...... 455/411

OTHER PUBLICATIONS

Technical Specification Group Radio Access Network; UTRAN architecture for 3G Home Node B (HNB); 3GPP TS 25.467 V8.2.0. (Jun. 2009).

Technical Specification Group Radio Access Network; Evolved Universal Terrestrial Radio Access (E-UTRA) and Evolved Universal Terrestrial Radio Access Network ; (E-UTRAN); 3GPP TS 36.300 V9.0.0 (Jun. 2009).

* cited by examiner

SYSTEMS AND METHODS FOR OBTAINING SUBSCRIBER ACCESS INFORMATION BY A CORE NETWORK IN A HANDOVER PROCESS

TECHNICAL FIELD

The present invention relates to the field of communication technologies, and in particular, to a system and method for implementing the access control to a User Equipment (UE) on the Radio Access Network (RAN) side during a handover process of H(e)NB system and notifying a core network of access information of the UE.

BACKGROUND OF THE RELATED ART

The H(e)NB (Home (e)NodeB) is a small, low power (e)NodeB, and is deployed in inner places such as the home and office etc. The main functions of the H(e)NB are to provide a higher service rate to users and reduce the cost required by using services at a high rate, and meanwhile make up the lack of coverage of existing distributed cellular wireless communication systems. The advantages of the H(e)NB are material benefit, convenience, low-power output, plug and play etc.

The H(e)NB is connected to the core network through a H(e)NB AN (Home (e)NodeB Access Network) (as shown in FIGS. 1, 2), wherein, the H(e)NB AN is commonly composed of a H(e)NB (Home (e)NodeB) and a H(e)NB GW (Home (e)NodeB Gateway). The functions primarily performed by the H(e)NB GW are to verify the security of H(e)NBs, deal with the registration and access control of the H(e)NBs, and be responsible for handovering data between the core network and the H(e)NBs. The H(e)MS system is a H(e)NB management system, which performs operation and maintenance management on the H(e)NBs, configures and controls the H(e)NBs according to operator requirements, and primarily implements configuration management function comprising verifying the position information, performing parameter configuration on the H(e)NB, and primarily designing parameter configuration to the CN-level for the H(e)NB, parameter configuration on the RAN side and parameter configuration of RF. For the HeNB (Home eNodeB/evolved home NodeB) system, the HeNB may be connected to the MME directly without through the HeNB GW.

With the development of the H(e)NB technologies, a Closed subscriber group (CSG) concept is introduced. The CSG is a closed subscriber group, which is used to perform packet management to the user, and the user belonging to a certain CSG is on the premise that the International Mobile User Identification Number (IMSI) of the terminal equipment thereof subscribes with the CSG. With the introduction of the CSG concept, the concept for the CSG access mode is introduced in the H(e)NBs, wherein, there are three access modes of the H(e)NBs for the CSG, which respectively are an open access mode, a close access mode, and a hybrid access mode; wherein, the H(e)NB with the open access mode permits the subscription user and non-subscription user to access, which has no difference from the normal macrocell; the H(e)NB with the close access mode merely permits the user subscribing with the CSG to access; while for the H(e)NB with the Hybrid access mode, although the H(e)NB permits simultaneously the subscription user and non-subscription user to access, the subscription user is superior to the non-subscription user, and in the condition that the resources are insufficient, the H(e)NB preferentially serves the subscription user, and may handovers the non-subscription user to other cells or releases the signaling connection thereof, wherein, determining the identity with which the UE accesses the network can be implemented according to allowed CSG lists of the UE. The allowed CSG lists are information lists of all CSGs with which the UE subscribes, and are stored at the network side and UE respectively. If the CSG to which the H(e)NB accessed by the UE belongs is in the allowed CSG list of the UE, the UE accesses by an identity of a subscription user, and the membership thereof is the close membership; otherwise, the UE accesses by an identity of a non-subscription user, and the membership thereof is the open membership. Further, for the HNB, in the condition that the HNB does not support the CSG or the UE does not support the CSG, it is the allowed IMSI list that corresponds to the allowed CSG List and it is stored in the HNB GW, and it is the IMSI list of the UE with which a certain particular HNB subscribes. When the UE which does not support the CSG accesses the Hybrid HNB, if the IMSI of the UE is in the allowed IMSI List, it is considered that the UE have subscribed with the HNB, and the membership thereof can be considered to be the subscription identity; otherwise, the UE accesses by a non-subscription identity.

As the hybrid cell treats the subscribed user and the non-subscribed user differently in terms of the services of the H(e)NB, the H(e)NB needs to know the identity with which the UE accesses, so as to differently process resource utilization according to identities. In this regard, it has been described in the related art. That is, for an initial access UE, if accessing the hybrid CSG cell, for the HeNB, its identity is notified to the HeNB by the CN when the initial context of the UE is established, and for the HNB, its identity is notified to the HNB in the process of the initial RAB assignment of the UE.

Not only the H(e)NB needs to know the real membership of the UE, but also the core network should explicitly know the access information of the UE, wherein, the access information not only includes the membership of the UE, but also includes the information of the corresponding access cell. The CN can perform statistics on the information of users accessing in different modes when knowing membership of UEs, and can treat differently in terms of charging etc. In the process of a handover, as the net elements which process the access control to the UE are different, it may cause the CN not to know the real access information of the UE. Particularly for the way of handover in the same GW, i.e., Intra-GW, when CN assists, the CN cannot totally know the information of the cell which UE accesses.

The handover of the intra-GWs refers to that the H(e)NBs initiating the handover belongs to the same H(e)NB gateway. That is, the source H(e)NB and the destination H(e)NB belong to the same H(e)NB GW. As the access control to the UE is implemented on the H(e)NB GW and there is no interact with the core network during the handover of the UE, the core network cannot obtain the access information of the UE per se and the information of the H(e)NB cell which the UE currently accesses.

Further, for the case of HeNB, the net element for access control to the CSG may be on the source HeNB, the MME or a destination HeNB GW. For the condition when the MME performs access control, MME knows the membership of the UE when performing the access control; however, when performing access control on the source HeNB and the destination HeNB GW, the MME does not know the real membership of the UE after the access control is implemented.

Further, for the HNB system, the UEs are divided into two kinds of UEs, i.e., the UE which supports the CSG and the UE which does not support the CSG. During a handover process, for the condition of supporting the CSG, the access control is similar to the case of the HeNB; and for the condition that the UE does not support the CSG, as the destination HNB GW stores the IMSI list of the UE subscribing with the destination HNB, the access control is implemented on the HNB GW, and for this, the CN cannot obtain the membership of the UE.

CONTENT OF THE INVENTION

The technical solution to be solved by the aspects of present invention is to provide a system and method for a core network to obtain access information of a user during a handover process, which can implement the transmission of the access information of the user to the core network during the handover process of the HNB/H(e)NB by the user.

In order to solve the above problem, an aspect of the present invention provides a method for a core network to obtain access information of a user during a handover process, comprising: when the user handovers between HNBs (home NodeBs) or HeNBs (home eNodeBs) and the core network does not carry out access control of the user, if a destination HeNB is connected to the core network directly or a user which does not support a closed subscriber group handovers to a hybrid destination HNB, a network element which controls the access of the user transmitting membership information of the user to the core network.

The method further comprises:

when the destination HeNB is connected to the core network directly, the destination HeNB controlling the access of the user after receiving a handover request message, and carrying the membership information of the user when transmitting a handover request response to a mobile management entity after finishing the access control.

When the user which does not support the closed subscriber group handovers from a source HNB to a hybrid destination HNB, the method further comprises:

a destination HNB gateway controlling the access of the user after receiving a relocation request message, and transmitting the relocation request message carrying the membership information of the user to the destination HNB when permitting to access the destination HNB;

the destination HNB transmitting a relocation request response message carrying the membership information of the user to the destination HNB getaway, and the destination HNB gateway transparently transmitting the relocation request response message including the membership information of the user to the core network.

When the user which does not support the closed subscriber group handovers from a source HNB to a hybrid destination HNB, the method further comprises:

a destination HNB gateway controlling the access of the user after receiving a relocation request message, and the destination HNB gateway transmitting the membership information of the user to the core network through a newly added message when finishing the access control; or the destination HNB gateway inserting the membership information of the user into a relocation request response message after receiving the relocation request response message returned by the destination HNB, and transmitting the relocation request response message including the membership information of the user to the core network.

Another aspect of the invention also provides a method for a core network to obtain access information of a user during a handover process, comprising:

when the user handovering between HNBs belonging to a same HNB gateway, and the core network does not carry out access control of the user, a destination HNB gateway/destination HeNB gateway transmitting the access information of the user to the core network; or the user handovering between HeNBs belonging to a same HeNB gateway, and the core network does not carry out access control of the user, the destination HNB/destination HeNB transmitting the access information of the user to the core network.

When a source HeNB and the destination HeNB being handovered belong to the same HeNB gateway, the method further comprises:

the HeNB gateway controlling the access of the user after receiving a handover requirement, and transmitting a handover request message carrying membership information of the user to the destination HeNB when permitting to access the destination HeNB; and after finishing the handover, the destination HeNB transmitting the access information of the user to the HeNB gateway, and the HeNB gateway transparently transmitting the received access information of the user to a mobile management entity; or the destination HeNB gateway transmitting the access information of the user to the mobile management entity;

the access information including the membership information of the user and global cell identity and closed subscriber group identity of a closed subscriber group cell which the user accesses.

When the source HNB and the destination HNB being handovered belong to the same HNB gateway, the method further comprises:

the HNB gateway controlling the access of the user after receiving a relocation required message, and transmitting the relocation request message carrying membership information of the user to the destination HNB when permitting to access the destination HNB; and after finishing the handover, the destination HNB transmitting the access information of the user to the core network, or the destination HNB gateway transmitting the access information of the user to the core network;

the access information including the membership information of the user and global cell identity and closed subscriber group identity of a closed subscriber group cell which the user accesses.

In the step of the destination HeNB gateway transmitting the access information of the user to the mobile management entity, the destination HeNB carries the access information of the user through a transmitted path handover request message, a handover notification message or a newly added message.

Another aspect of the invention also provides a system for a core network to obtain access information of a user during a handover process, comprising a source HNB, a destination HNB, a source HNB gateway, a destination HNB gateway and a core network, wherein, when the user handovers between the source HNB and the destination HNB and the core network does not carry out access control, the destination HNB gateway is configured to carry out access controlling of the user and transmit membership information of the user to the core network when a user which does not support closed subscriber group handovers to a hybrid destination HNB.

The destination HNB gateway is further configured to carry out access control of the user after receiving a relocation request message when the user which does not support closed subscriber group handovers from a source HNB to a hybrid destination HNB; and transmitting the relocation request message carrying the membership information of the user to the destination HNB when permitting to access the destination HNB;

the destination HNB is configured to carry the membership information of the user when transmitting the relocation request response message to the destination HNB gateway;

the destination HNB gateway is further configured to transparently transmit the relocation request response message including the membership information of the user to the core network.

The destination HNB gateway is further configured to:

carry out access control of the user after receiving the relocation request message, when the user which does not support closed subscriber group handovers from the source HNB to the hybrid destination HNB;

transmitting the membership information of the user to the core network after finishing the access control; or inserting the membership information of the user into the relocation request response message after receiving the relocation request response message returned by the destination HNB; and transmitting the relocation request response message including the membership information of the user to the core network.

Another aspect of the invention also provides a system for a core network to obtain access information of a user during a handover process, comprising a source HNB, a destination HNB, a HNB gateway and a core network, wherein, the HNB gateway is configured to transmit the access information of the user to the core network when the user handovers between the source HNB and the destination HNB belonging to a same HNB gateway and the core network does not perform access control; and the destination HNB is configured to transmit the access information of the user to the core network when the user handovers between the source HNB and the destination HNB belonging to the same HNB gateway and the core network does not perform the access control.

The HNB gateway is further configured to carry out access control of the user after receiving a relocation required message, and transmit a relocation request message carrying membership information of the user to the destination HNB when permitting to access the destination HNB;

the destination HNB is further configured to transmit the access information of the user to the HNB gateway after finishing the handover;

the HNB gateway is further configured to transparently transmit the received access information of the user to the core network;

the access information including the membership information of the user and global cell identity and closed subscriber group identity of a closed subscriber group cell which the user accesses.

The HNB gateway is further configured to:

carry out access control of the user after receiving the relocation required message, and transmit a relocation request message carrying membership information of the user to the destination HNB when permitting to access the destination HNB; and after finishing the handover, transmit the access information of the user to the core network;

the access information including the membership information of the user and global cell identity and closed subscriber group identity of a closed subscriber group cell which the user accesses.

Another aspect of the invention also provides a system for a core network to obtain access information of a user during a handover process, comprising a source HeNB, a destination HeNB and a mobile management entity, wherein, the destination HeNB is connected to the mobile management entity directly;

the destination HeNB is configured to transmit membership information of the user to the mobile management entity when the user handovers between the source HeNB and the destination HeNB and the core network does not perform access control.

The destination HeNB is further configured to carry out access control of the user after receiving the handover request message;

the destination HeNB is configured to transmit the membership information of the user to the mobile management entity, which comprises carrying the membership information of the user when transmitting a handover request response to the mobile management entity.

Another aspect of the invention also provides a system for a core network to obtain access information of a user during a handover process, comprising a source HeNB, a destination HeNB, an HeNB gateway and a mobile management entity, wherein, the HeNB gateway is configured to transmit the access information of the user to the mobile management entity when the user handovers between HeNBs belonging to a same HeNB gateway and the core network does not perform access control;

the destination HeNB is configured to transmit the access information of the user to the mobile management entity when the user handovers between the HeNBs belonging to the same HeNB gateway and the core network does not perform access control.

The HeNB gateway is further configured to carry out access control of the user after receiving a handover requirement, and transmit a handover request message carrying the membership information of the user to the destination HeNB when permitting to access the destination HeNB;

the destination HeNB is further configured to transmit the access information of the user to the HeNB gateway after finishing the handover;

the HeNB gateway is further configured to transparently transmit the received access information of the user to the mobile management entity;

the access information including the membership information of the user and global cell identity and closed subscriber group identity of a closed subscriber group cell which the user accesses.

The HeNB gateway is further configured to carry out access control of the user after receiving a handover requirement, and transmit a handover request message carrying the membership information of the user to the destination HeNB when permitting to access the destination HeNB;

the HeNB gateway is further configured to transmit the access information of the user to the mobile management entity;

the access information including the membership information of the user and global cell identity and closed subscriber group identity of a closed subscriber group cell which the user accesses.

In conclusion, the present invention provides a system and method for a core network to obtain access information of a user during a handover process, which can implement the following: under the condition that the RAN side controlling the access of the UE during the handover process and the CN cannot know the membership of the UE, the RAN side notifying the core network of the membership information of the UE and the information of the H(e)NB which the UE accesses.

PREFERRED EMBODIMENTS OF THE PRESENT INVENTION

Figure 1:
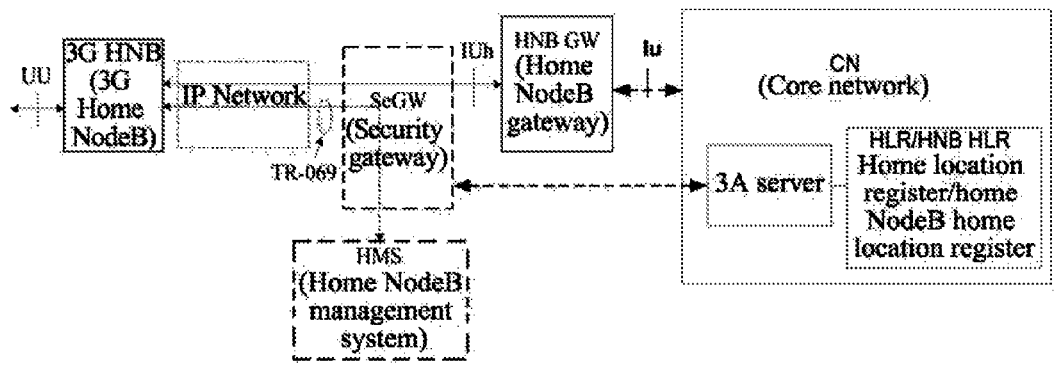
FIG. 1 is a structure diagram of a HNB system.
Figure 2:
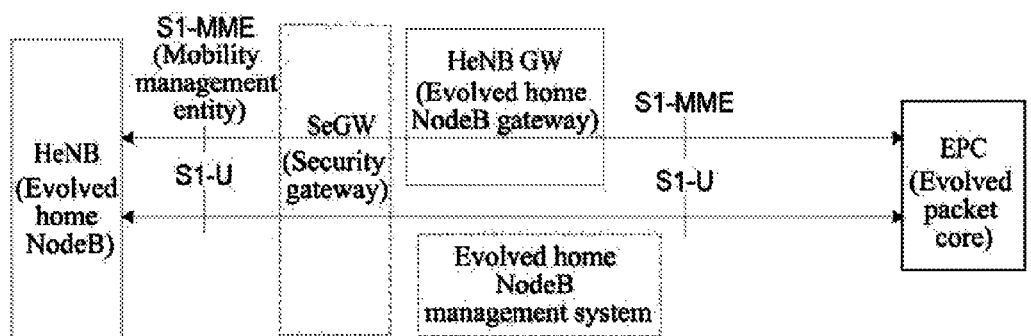
FIG. 2 is a structure diagram of a HeNB system.

For the above problems, the present invention provides a system and method for solving the problem caused in a handover process of a UE that the core network cannot know the membership of the UE and the information of the H(e)NB which the UE accesses.

SYSTEM EXAMPLES

Example One

The example provides a system for a core network to obtain access information of a user during a handover process, comprising a source HNB, a destination HNB, a source HNB GW, a destination HNB GW and a CN; the source HNB and the destination HNB belong to the same HNB GW or belong to different HNB GWs;

When the user handovers between the source HNB and the destination HNB and the CN does not perform access control, the destination HNB GW is used to carry out access control of the user and transmit the membership information of the user to the CN when the user which does not support a CSG handovers to a hybrid destination HNB; specifically, when the user which does not support the CSG handovers from the source HNB to the hybrid destination HNB, the destination HNB GW is used to carry out access control of the user after receiving a relocation request message, and transmit the relocation request message carrying the membership information of the user to the destination HNB when permitting to access the destination HNB;

the destination HNB can be used to carry the membership information of the user when transmitting the relocation request response message to the destination HNB GW; and the destination HNB GW can further be used to transparently transmit the relocation request response message including the membership information of the user to the CN.

the destination HNB GW can further be used to transmit the membership information of the user to the CN after finishing the access control; and can further be used to insert the membership information of the user into the relocation request response message after receiving the relocation request response message returned by the HNB, and transmit the relocation request response message including the membership information of the user to the CN.

Example Two

The present example provides a system for a core network to obtain access information of a user during a handover process, comprising a source HNB, a destination HNB, a HNB GW and a CN;

When the user handovers between the source HNB and the destination HNB belonging to the same HNB GW and the CN does not perform access control, the HNB GW or the destination HNB is used to transmit the access information of the user to the CN.

The HNB GW is used to carry out access control of the user after receiving the relocation required message and transmit the relocation request message carrying the membership information of the user to the destination HNB when permitting to access the destination HNB;

the HNB can be used to transmit the access information of the user to the HNB GW after finishing the handover; the HNB GW can be used to transparently transmit the received access information of the user to the CN;

the HNB GW can further be used to transmit the access information of the user to the CN after finishing the handover.

The above access information includes the membership information of the user and Global Cell Identity (CGI) and CSG Identity (CSG ID) of the CSG cell which the user accesses.

Example Three

The present example provides a system for a core network to obtain access information of a user during a handover process, comprising: a source HeNB, a destination HeNB and a MME; wherein, the destination HeNB is connected to the MME directly;

the destination HeNB is used to transmit the membership information of the user to the MME when the user handovers between the source HeNB and the destination HeNB and MME does not perform access control.

The destination HeNB is further used to carry out access control of the user after receiving the handover request message;

that the HeNB is used to transmit the membership information of the user to the core network refers to carrying the membership information of the user when the HeNB transmits a handover request response to the MME.

Example Four

The present example provides a system for a core network to obtain access information of a user during a handover process, comprising: a source HeNB, a destination HeNB, a HeNB GW and a MME; the source HeNB and the destination HeNB belong to the same HeNB GW;

the destination HeNB GW or the destination HeNB is used to transmit the access information of the user to the MME when the user handovers between the source HeNB and the destination HeNB and the core network does not perform access control.

The HeNB GW is used to carry out access control of the user after receiving the handovering requirement, and transmit a handover request message carrying the membership information of the user to the destination HeNB when permitting to access the destination HeNB;

the destination HeNB is used to transmit the access information of the user to the HeNB GW after finishing the handover; and the HeNB GW is further used to transparently transmit the received access information of the user to the MME;

the HeNB GW can further be used to transmit the access information of the user to the MME;

The above access information includes the membership information of the user and the CGI and CSG ID of the CSG cell which the user accesses.

METHOD EXAMPLES

The methods for notifying the core network of access information of the UE in handover conditions under different scenes will be described respectively hereinafter in combination with drawings.

Example One

Figure 3:
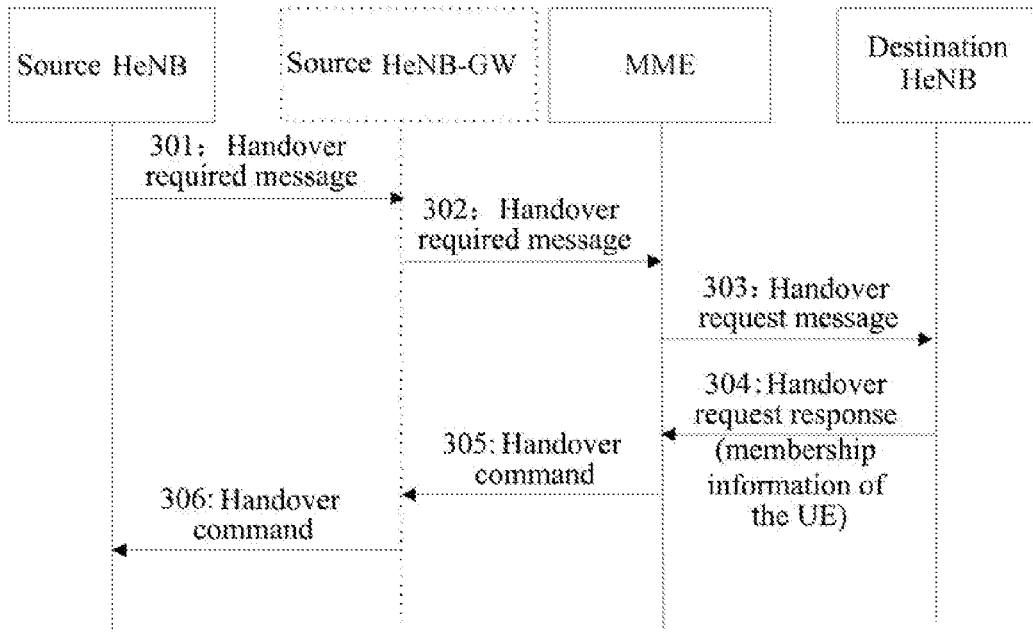
FIG. 3 is a handover through the MME with an access control being performed on the destination side according to the present invention.

The present embodiment describes the flow of notifying the membership of the UE when the destination HeNB is directly connected to the MME, and the access control of the UE is implemented on the destination HeNB, and the handover process is implemented through the MME. The handover determination of the process is implemented on the destination HeNB. During the handover, the MME transmits the allowed CSG list of the UE to the destination HeNB, and the destination HeNB feeds back the membership of the UE to the MME after finishing the handover determination. As shown in FIG. 3 (the dotted line in the figure represents that the process or net element is optional), the specific process is as follows:

step 301: the source HeNB initiating the handover process according to the measurement results of the UE in the condition of meeting the handover; firstly, the source HeNB transmitting a handover required message to the HeNB GW or directly transmitting the handovering required message to the MME;

step 302: if the handover requirement is transmitted to the HeNB GW, the HeNB GW transmitting the message to the MME;

step 303: the MME transmitting a handover request to the destination HeNB according to routing information on the destination side in the handover required message after receiving the handover required message, and in the process, the MME transmitting the allowed CSG list on which the determination of the access control of the UE depends to the destination HeNB;

step 304: the destination HeNB transmitting a handover request response to the MME after the destination HeNB receiving the handover request and controlling the access of the UE, and carrying the membership information of the UE in the handover request response message;

the method for the destination HeNB to determine the access control of the UE is not limited by the present invention. Whether the UE is permitted to access the destination HeNB can be determined by the allowed CSG list of the UE.

step 305: the MME obtaining the membership of the UE and transmitting a handover command to the source HeNB after receiving the handover request response;

step 306: if the handovering command passes the HeNB GW, the HeNB GW transparently transmitting the handovering command to the source HeNB.

With the above process, the handover between the HeNBs is implemented, and the membership of the UE is notified to the net element of the core network i.e., the MME in the process.

Example Two

Figure 4:
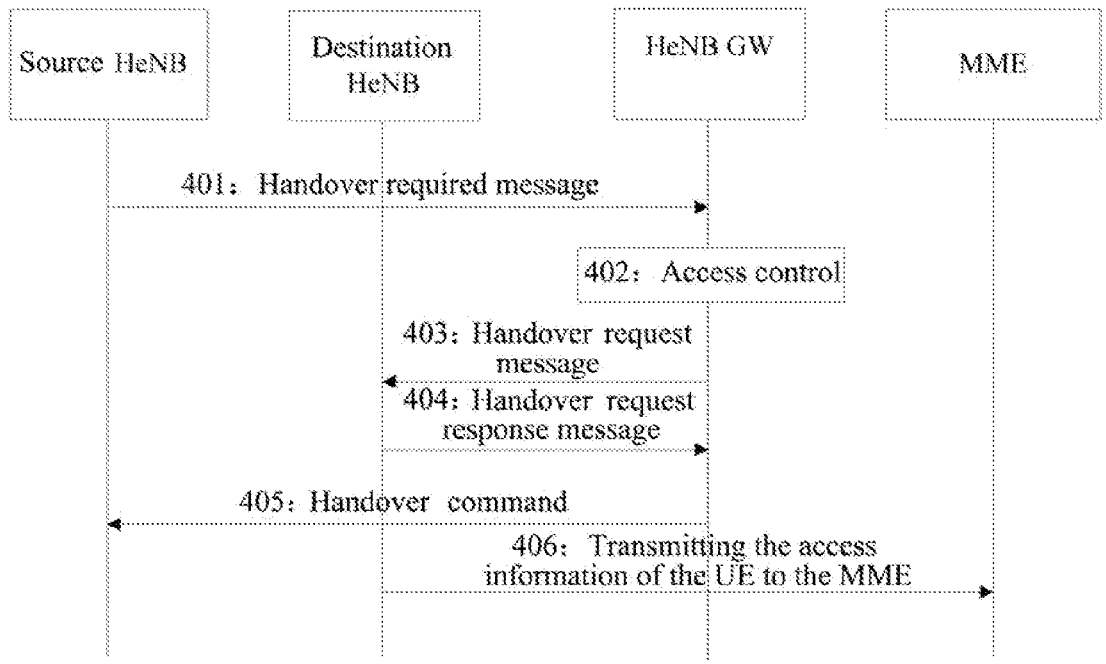
FIG. 4 is a handover process to the HeNB without the MME according to the present invention.

The present example describes the condition that the source HeNB and the destination HeNB being handovered belong to the same HeNB GW, i.e., so-called handover under Intra-GW. In the handover process, the CN may assists in participating the handover process. However, the controlling of the access of the UE is implemented on the HeNB GW. As shown in FIG. 4, the specific process is described as follows:

step 401: the source HeNB determining that the destination HeNB performs a handover according to the measurement report information of the UE, transmitting a handover required message to the HeNB GW, and carrying the information of the destination HeNB (for example, the information may be the Id of the destination HeNB);

step 402: the HeNB GW determining that the destination HeNB and the source HeNB belong to the same HeNB GW according to the Tracking Area Identity (TAI) in the handover requirement after receiving the handover requirement, and making determination on the access control of the UE;

the method for the destination HeNB to determine the access control of the UE is not limited by the present invention. It can be determined that the UE can access through the information provided by the HeNB, or the determination on the access control of the UE can be made by interacting with the access control information of the CN.

step 403: the HeNB GW transmitting a handover request message to the destination HeNB in the condition of determining to permit to access the destination HeNB after finishing the access control to the UE, and carrying the membership information of the UE in the message;

step 404: the destination HeNB transmitting a handover request response message to the HeNB GW;

step 405: the HeNB GW transmitting a handover command to the source HeNB;

step 406: the destination HeNB transmitting the access information of the UE to the HeNB GW after finishing the handover, and the HeNB GW then transparently transmitting the received access information of the UE to the MME;

the access information of the UE including the membership information of the UE and the information of the destination HeNB; and the information of the destination HeNB is the information such as CGI and CSG ID of the CSG cell which the UE accesses.

The destination HeNB can transmit the membership information of the UE and the information of the destination HeNB through a Path Handover Request message during the path handover process, or transmit the membership information of the UE and the information of the destination HeNB through a handover notify message, and can also transmit the membership information of the UE and the information of the destination HeNB through a newly added message.

In step 406, the HeNB GW can further notify the MME of the membership information of the UE and the information of the destination HeNB after finishing the handover.

With the above process, the handover of the UE between the HeNBs within the Intra-GW is implemented, and the access information of the UE is notified to the MME through the process.

Example Three

Figure 5:
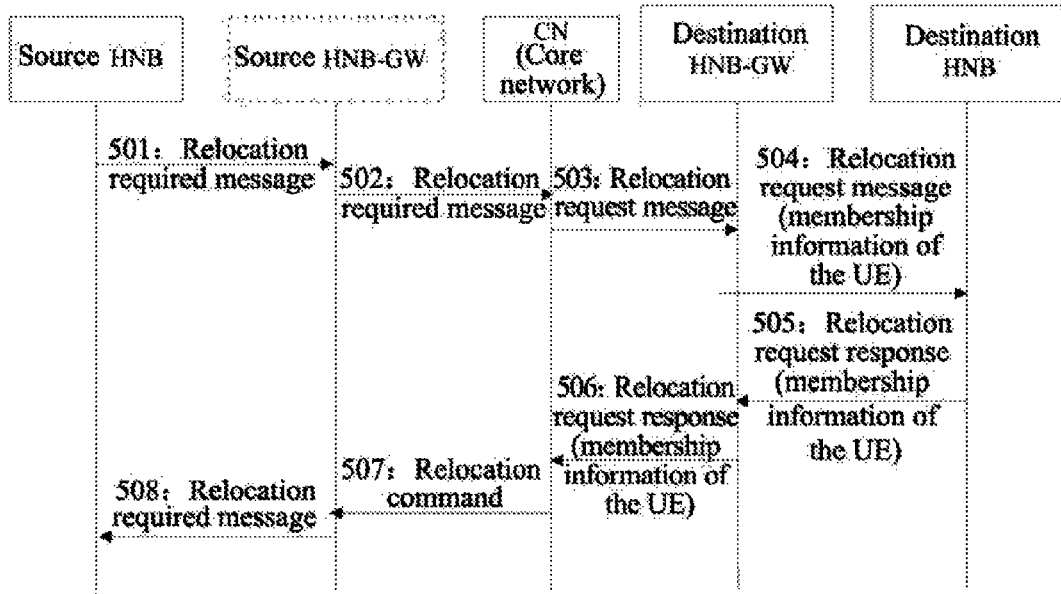
FIG. 5 is a handover process from a UE not supporting a CSG to a Hybrid HNB according to the present invention.

The present embodiment describes the notification process of the membership of the UE in the condition that the access control of the UE is implemented on the destination HNB GW, and the handover process is implemented through the CN. In the present embodiment, the real membership of the UE is notified to the CN after the destination HNB GW finishes the access control of the UE, in the condition that the UE which does not support CSG handovers to a HNB of a Hybrid CSG. As shown in FIG. 5, the specific process is described as follows:

step 501: the source HNB determining the destination HNB according to the measurement report information of the UE; the source HNB transmitting a relocation required message to the source HNB GW;

step 502: the source HNB GW forwarding the relocation required message to the CN;

step 503: the CN routing and transmitting a relocation request message to the destination HNB GW according to the destination information in the relocation requirement;

step 504: the destination HNB GW determining whether to carry out access control of the UE according to the capability or version of the UE after receiving the relocation request message. In the present example, it is assumed that the destination HNB GW needs to carry out access control of the UE, and the destination HNB GW notifying the destination HNB of the membership information of the UE through the relocation request message transmitted to the destination HNB after finishing access control of the UE;

in step 504, the HNB GW can notify the CN of the membership information of the UE through a newly added message after determining the membership of the UE, that is, there is no need to transmit the membership information of the UE through the request response message in step 506; the HNB GW can also not carry the membership information of the UE in the relocation request message, and instead, insert the membership information into the relocation request response message after receiving the relocation request response message returned by the destination HNB.

step 505: the destination HNB constructing the relocation request response message including the membership information of the UE, and the destination HNB transmitting the relocation request response message to the destination HNB GW;

step 506: the destination HNB GW transparently transmitting the relocation request response message to the CN, and the CN parsing the relocation request response message and obtaining the membership information of the UE;

step 507: the CN transmitting a relocation command to the source HNB GW;

step 508: the source HNB GW forwarding the relocation command to the source HNB, and finishing the message interaction process on the network side during the handover of the UE;

With the above process, the handover process of the UE which does not support the CSG is implemented, and the membership information of the UE is transmitted to the CN.

Example Four

Figure 6:
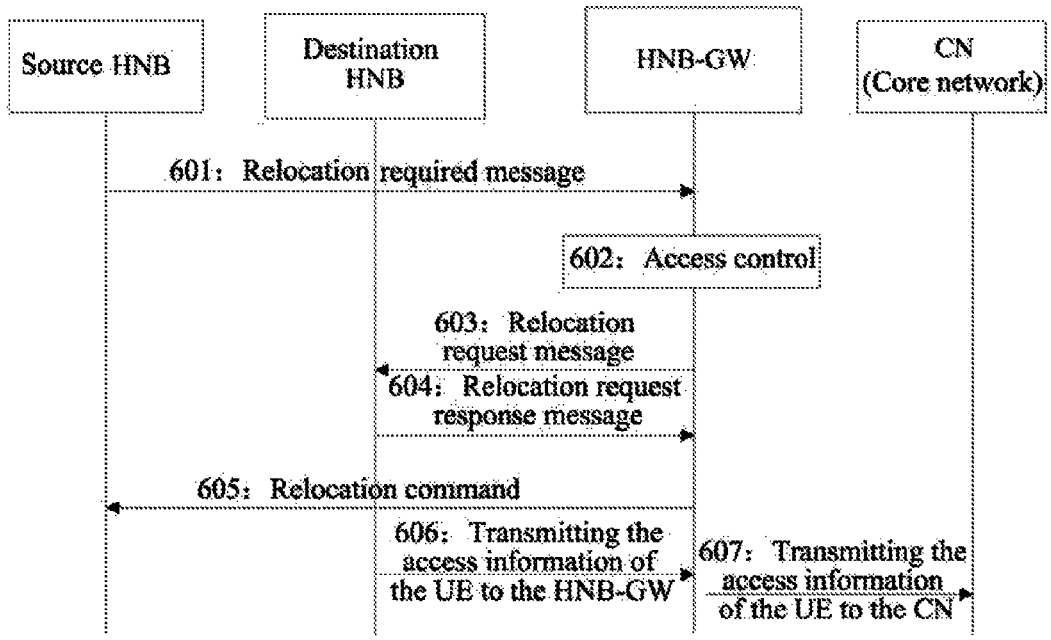
FIG. 6 is a handover process to a HNB without the CN according to the present invention.

The present embodiment describes the notification process of the membership of the UE in the condition that the access control of the UE is implemented on the HNB GW, and the handover process is not implemented through the CN. As shown in FIG. 6, the specific process is described as follows:

step 601: the source HNB determining that the destination HNB handovers according to the measurement report information of the UE; and the source HNB transmitting a relocation required message to the source HNB GW;

step 602: the source HNB GW determining that the destination HNB and the source HNB belong to the same HNB GW, and the HNB GW performing access control to the UE;

the specific method of the access control is not limited by the present invention, the information provided by the HeNB can be used to determine whether the UE can access, or the HNB GW determines the access control of the UE according to the obtained information of the access control of the UE, i.e., allowed CSG list or allowed IMSI list.

step 603: the HNB GW transmitting a relocation request message carrying the membership information of the UE to the destination HNB in the condition that the HNB GW determines to permit to access the destination HNB;

step 604: if permitting the UE to access, the HNB transmitting a relocation request response message to the HNB GW;

step 605: the HNB GW transmitting a relocation command to the source HNB after receiving the relocation request response message of the destination HNB;

step 606: the destination HNB transmitting the access information of the UE to the HNB GW, and the HNB GW then transparently transmitting the received access information of the UE to the CN.

The destination HNB can transmit the access information of the UE through a newly added message;

the access information of the UE includes the membership information of the UE and the information of the destination HeNB; and the information of the destination HeNB is the information such as CGI, CSG ID etc. of the CSG cell which the UE accesses;

The access information of the UE can be transmitted to the CN by the HNB GW after finishing the handover.

INDUSTRIAL APPLICABILITY

The present invention provides a system and method for a core network to obtain access information of a user during a handover process, which can implement the following: under the condition that the RAN side controlling the access of the UE during the handover process and the CN cannot know the membership of the UE, the RAN side notifying the core network of the membership information of the UE and the information of the H(e)NB which the UE accesses.

What we claim is:

1. A method for a core network to obtain access information of a user during a handover process, comprising:
when the user handovers between HNBs (home NodeBs) or HeNBs (home eNodeBs) and the core network does not carry out access control of the user,
when a destination HeNB is connected to the core network directly or a user which does not support a closed subscriber group handovers to a hybrid destination HNB, a radio access network element which carries out the access control of the user transmitting membership information of the user to the core network after the access control of the user for the handover.

2. The method according to claim 1, the method further comprising:
when the destination HeNB is connected to the core network directly, the destination HeNB carrying out the access control of the user after receiving a handover request message, and carrying the membership information of the user when transmitting a handover request response to a mobile management entity after finishing the access control.

3. The method according to claim 1, wherein, when the user which does not support the closed subscriber group handovers from a source HNB to a hybrid destination HNB, the method further comprises:
- a destination HNB gateway carrying out the access control of the user after receiving a relocation request message, and transmitting the relocation request message carrying the membership information of the user to the destination HNB when permitting to access the destination HNB;
- the destination HNB transmitting a relocation request response message carrying the membership information of the user to the destination HNB getaway, and the destination HNB gateway transparently transmitting the relocation request response message including the membership information of the user to the core network.

4. The method according to claim 1, wherein, when the user which does not support the closed subscriber group handovers from a source HNB to a hybrid destination HNB, the method further comprises:
- a destination HNB gateway carrying out the access control of the user after receiving a relocation request message, and the destination HNB gateway transmitting the membership information of the user to the core network through a newly added message when finishing the access control; or
- the destination HNB gateway inserting the membership information of the user into a relocation request response message after receiving the relocation request response message returned by the destination HNB, and transmitting the relocation request response message including the membership information of the user to the core network.

5. A method for a core network to obtain access information of a user during a handover process, comprising:
- when the user handovering between HNBs belonging to a same HNB gateway, and the core network does not carry out access control of the user, a destination HNB or the HNB gateway transmitting the access information of the user to the core network after the access control of the user for the handover; and
- when the user handovering between HeNBs belonging to a same HeNB gateway, and the core network does not carry out access control of the user, a destination HeNB or the HeNB gateway transmitting the access information of the user to the core network after the access control of the user for the handover.

6. The method according to claim 5, wherein, when a source HeNB and the destination HeNB being handovered belong to the same HeNB gateway, the method further comprises:
- the HeNB gateway carrying out the access control of the user after receiving a handover requirement, and transmitting a handover request message carrying membership information of the user to the destination HeNB when permitting to access the destination HeNB; and
- after finishing the handover, the destination HeNB transmitting the access information of the user to the HeNB gateway, and the HeNB gateway transparently transmitting the received access information of the user to a mobile management entity, or the destination HeNB gateway transmitting the access information of the user to the mobile management entity;
- the access information including the membership information of the user and global cell identity and closed subscriber group identity of a closed subscriber group cell which the user accesses.

7. The method according to claim 5, wherein, when the source HNB and the destination HNB being handovered belong to the same HNB gateway, the method further comprises:
- the HNB gateway carrying out the access control of the user after receiving a relocation required message, and transmitting the relocation request message carrying membership information of the user to the destination HNB when permitting to access the destination HNB; and
- after finishing the handover, the destination HNB transmitting the access information of the user to the core network, or the destination HNB gateway transmitting the access information of the user to the core network;
- the access information including the membership information of the user and global cell identity and closed subscriber group identity of a closed subscriber group cell which the user accesses.

8. The method according to claim 6, wherein,
when the destination HeNB gateway transmits the access information of the user to the mobile management entity, the destination HeNB carries the access information of the user through a transmitted path handover request message, a handover notification message or a newly added message.

9. A system for a core network to obtain access information of a user during a handover process, comprising:
- a source HNB, a destination HNB, a source HNB gateway, a destination HNB gateway and a core network, wherein,
- when the user handovers between the source HNB and the destination HNB and the core network does not carry out access control,
- the destination HNB gateway is configured to carry out access controlling of the user and transmit membership information of the user to the core network after the access control of the user for the handover when the user which does not support closed subscriber group handovers to a hybrid destination HNB, and,
- when the source HNB gateway and the destination HNB gateway are a same HNB gateway and the core network does not carry out access control, the same HNB gateway or the destination HNB gateway is configured to transmit the membership information of the user to the core network after the access control of the user for the handover.

10. The system according to claim 9, wherein:
- the destination HNB gateway is further configured to carry out the access control of the user after receiving a relocation request message when the user which does not support closed subscriber group handovers from a source HNB to a hybrid destination HNB; and transmitting the relocation request message carrying the membership information of the user to the destination HNB when permitting to access the destination HNB;
- the destination HNB is configured to carry the membership information of the user when transmitting the relocation request response message to the destination HNB gateway;
- the destination HNB gateway is further configured to transparently transmit the relocation request response message including the membership information of the user to the core network.

11. The system according to claim 9, wherein, the destination HNB gateway is further configured to:

carry out the access control of the user after receiving the relocation request message, when the user which does not support closed subscriber group handovers from the source HNB to the hybrid destination HNB;

transmitting the membership information of the user to the core network after finishing the access control, or inserting the membership information of the user into the relocation request response message after receiving the relocation request response message returned by the destination HNB; and transmitting the relocation request response message including the membership information of the user to the core network.

12. A system for a core network to obtain access information of a user during a handover process, comprising:
a source HeNB, a destination HeNB and a mobile management entity, wherein,
when the destination HeNB is connected to the mobile management entity directly, the destination HeNB is configured to transmit membership information of the user to the mobile management entity when the user handovers between the source HeNB and the destination HeNB and the core network does not carry out access control;
when the system further comprises a HeNB gateway and the HeNB gateway is connected to the mobile management entity,
the HeNB gateway is configured to transmit the access information of the user to the mobile management entity when the user handovers between HeNBs belonging to a same HeNB gateway and the core network does not carry out access control, or
the destination HeNB is configured to transmit the access information of the user to the mobile management entity when the user handovers between the HeNBs belonging to the same HeNB gateway and the core network does not perform access control.

13. The system according to claim 12, wherein, when the destination HeNB is directly connected to the mobile management entity,
the destination HeNB is further configured to carry out access control of the user after receiving the handover request message;
the destination HeNB is configured to transmit the membership information of the user to the mobile management entity, which comprises carrying the membership information of the user when transmitting a handover request response to the mobile management entity.

14. The system according to claim 9, wherein,
the same HNB gateway is further configured to: carry out the access control of the user after receiving a relocation required message, and transmit a relocation request message carrying membership information of the user to the destination HNB when permitting to access the destination HNB;
the destination HNB is further configured to: transmit the access information of the user to the same HNB gateway after finishing the handover;

the HNB gateway is further configured to: transparently transmit the received access information of the user to the core network;
the access information including the membership information of the user and global cell identity and closed subscriber group identity of a closed subscriber group cell which the user accesses.

15. The system according to claim 9, wherein, the same HNB gateway is further configured to:
carry out the access control of the user after receiving a relocation required message, and transmit a relocation request message carrying membership information of the user to the destination HNB when permitting to access the destination HNB; and
transmit the access information of the user to the core network after finishing the handover;
the access information including the membership information of the user and global cell identity and closed subscriber group identity of a closed subscriber group cell which the user accesses.

16. The system according to claim 12, wherein, when the HeNB gateway is connected to the mobile management entity,
the HeNB gateway is further configured to carry out access control of the user after receiving a handover requirement, and transmit a handover request message carrying the membership information of the user to the destination HeNB when permitting to access the destination HeNB;
the destination HeNB is further configured to transmit the access information of the user to the HeNB gateway after finishing the handover;
the HeNB gateway is further configured to transparently transmit the received access information of the user to the mobile management entity;
the access information including the membership information of the user and global cell identity and closed subscriber group identity of a closed subscriber group cell which the user accesses.

17. The system according to claim 12, wherein, when the HeNB gateway is connected to the mobile management entity,
the HeNB gateway is further configured to carry out access control of the user after receiving a handover requirement, and transmit a handover request message carrying the membership information of the user to the destination HeNB when permitting to access the destination HeNB;
the HeNB gateway is further configured to transmit the access information of the user to the mobile management entity;
the access information including the membership information of the user and global cell identity and closed subscriber group identity of a closed subscriber group cell which the user accesses.

* * * * *